Figure 1:
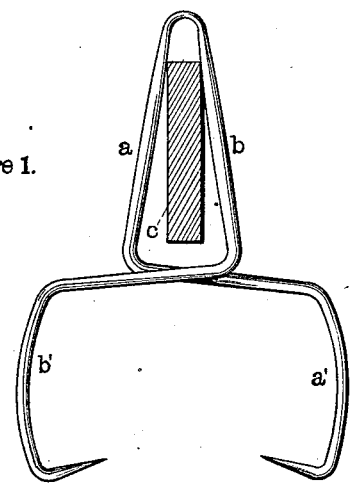

T. WOOD, Jr.
Tobacco-Hook.

No. 217,719. Patented July 22, 1879.

Witnesses:
Robt. Gaylord
H. B. Freeman

Inventor:
Thos. Wood Jr.
By Wm. Simonds
Atty.

UNITED STATES PATENT OFFICE.

THOMAS WOOD, JR., OF HARTFORD, CONNECTICUT, ASSIGNOR OF ONE-HALF HIS RIGHT TO CECILIA A. WHITE, OF SAME PLACE.

IMPROVEMENT IN TOBACCO-HOOKS.

Specification forming part of Letters Patent No. 217,719, dated July 22, 1879; application filed March 7, 1879.

*To all whom it may concern:*

Be it known that I, THOMAS WOOD, Jr., of Hartford, in the county of Hartford and State of Connecticut, have invented certain new and useful Improvements pertaining to Tobacco-Hooks, of which the following is a specification, reference being had to the accompanying drawing, which is a side view of a tobacco-hook of my improved construction hung upon a lath.

My present invention is an improvement on the tobacco-hook patented to A. Putnam, Jr., March 21, 1865, by Letters Patent No. 46,940.

The distinguishing feature of my improvement is such a formation of the hook that when suspended from a lath or other equivalent support a tobacco-plant suspended by it (the hook) will tend to draw the hook-points together, and thus prevent the hook from losing its hold by the plant shrinking away from the points while curing.

This hook is made of elastic wire, all in one piece. The upper part is formed into a triangular shape.

The letters $a$ $b$ denote two sides of the triangle. Below or at the lower end of the triangle the wires cross, curve downward, and then are formed into hook-points.

For the sake of description I denominate that part below the triangle a "hook," the wire $a$ being formed into hook $a'$, and the wire $b$ into hook $b'$. The hook-points tend toward each other.

Now, when the lath $c$ or its equivalent—a peg sufficiently large to spread sides $a$ $b$—is inserted through the triangle and the hook-points are inserted into a tobacco-plant, the weight of the plant will cause, or tend to cause, the sides $a$ $b$ of the triangle to spread apart and the two hook-points to approach each other, and so tighten the hold of the hooks on the suspended plant.

I am aware that other hooks similar in shape to mine (except for the triangular-shaped top) have been used for this same purpose, and have proved of no practical value, because of their tendency to loose their hold on the object suspended and allow it to fall, and, in the case of tobacco-plants, be destroyed. Such a hook I do not claim, as in my invention the combination of the triangular-shaped top with a lath or some other object suited to spread the sides with the suspension of a plant is essential, while other hooks used for this purpose do not show such a combination.

By flattening the wire which forms the side of the triangle, as represented in the drawing, a much smaller size of wire can be used than would otherwise be requisite.

I claim as my invention—

A tobacco-hook composed of a single piece of elastic metal formed into the triangle sides $a$ $b$, and below that into the hooks $a'$ $b'$, in combination with the lath $c$, or its equivalent, all substantially as shown and described.

THOMAS WOOD, JR.

Witnesses:
ROBT. F. GAYLORD,
HENRY SMALL.